United States Patent [19]
Eisenberg et al.

[11] Patent Number: 5,561,767
[45] Date of Patent: Oct. 1, 1996

[54] SAFETY CRITICAL PROCESSOR AND PROCESSING METHOD FOR A DATA PROCESSING SYSTEM

[75] Inventors: Alan J. Eisenberg, Monmouth Junction, N.J.; Alexander M. Adelson, Peekskill, N.Y.; James A. Eby, Pennington; Joel E. Medeiros, Delran, both of N.J.

[73] Assignee: Base 10 Systems, Inc., Trentron, N.J.

[21] Appl. No.: 400,630

[22] Filed: Mar. 7, 1995

Related U.S. Application Data

[63] Continuation of Ser. No. 983,489, Nov. 30, 1992, abandoned.

[51] Int. Cl.[6] .............................. G06F 11/34; G06F 11/00
[52] U.S. Cl. ........................ 395/184.01; 395/182.09
[58] Field of Search .......................... 395/182.07, 182.08, 395/183.07, 183.21, 183.22, 184.01, 650, 700; 371/29.1

[56] References Cited

U.S. PATENT DOCUMENTS 4,674,038  6/1987  Brelspid et al. ................... 371/16.1
4,695,946  9/1987  Andreasen et al. ................ 364/200
4,701,845  10/1987 Andreasen et al. ................ 364/200
4,726,024  2/1988  Couziak et al. ................... 371/16.1
4,787,031  11/1988 Karger et al. ..................... 364/200
4,839,745  6/1989  Tindall ............................ 371/10.1
5,008,805  4/1991  Fiebig et al. ..................... 364/184
5,130,922  7/1992  Lui ................................ 395/200
5,175,847  12/1992 Mellott ............................ 395/575
5,319,645  6/1994  Bassi et al. ...................... 371/19
5,339,261  8/1994  Adelson et al. ................... 371/16.5

Primary Examiner—Robert W. Beausoliel, Jr.
Assistant Examiner—Albert Décady
Attorney, Agent, or Firm—Sprung Horn Kramer & Woods

[57] ABSTRACT

A system and method for operating application software in a safety critical environment have a data processor for effecting processing operations and an intermediate shell for interacting with an operating system and application software. A safety critical processor is receptive of a series of timing signals from the intermediate shell for determining that a time interval between two of the series of timing signals is greater than a predetermined value thereby constituting a potential safety critical failure and indicates a potential safety critical failure to the intermediate shell.

21 Claims, 3 Drawing Sheets

SAFETY CRITICAL PROCESSOR AND PROCESSING METHOD FOR A DATA PROCESSING SYSTEM

This application is a continuation of application Ser. No. 07/983,489, filed Nov. 30, 1992, now abandoned.

BACKGROUND OF THE INVENTION

The present invention relates to a safety critical processor and processing method for a data processing system.

A safety critical environment is one in which a computer software activity (process, functions, etc.) whose errors, such as inadvertent or unauthorized occurrences, failure to occur when required, erroneous values, or undetected hardware failures can result in a potential hazard, or loss of predictability of system outcome. A safety critical environment is necessary for safety critical computer software components wherein an inadvertent action might be directly responsible for death, injury, occupational illness, or significant operation, or where the results of a computer action would be relied on for decisions which might cause death, injury, or a significant action. A safety critical environment is a common set of standards or understandings and is addressed in military specifications, such as MIL-STD-882B, which acts in concert with software which is developed under DOD-STD-2167 and DOD-STD-2168. Additionally, the ability to review and audit the operations of a computer program, after completion of its execution, to insure compliance, becomes a part of the safety critical environment.

In U.S. Pat. No. 5,339,261, a system is disclosed for providing a safety critical environment in a data processing system which is normally not capable of providing a safety critical environment and which operates with an industry standard operating system for a personal computer. In that system, an intermediate operating shell is superimposed on a standard personal computer operating system, such as DOS, the System 7 operating system for the Macintosh, Windows, OS/2, etc., and the function of the intermediate shell is to emulate a safety critical environment for a personal computer which is normally not a safety critical system. The shell monitors the performance integrity of the system as a safety critical instrument and interacts with the operating system to watch all system functions for safety critical performance deviations and either corrects them in real time or stops the system from proceeding. The shell also has the function of interacting with application software so that the application software does not have to interact with the normal operating system. The disclosure of U.S. Pat. No. 5,339,261 is hereby incorporated by reference.

Whereas the system described in the aforementioned Patent is capable of carrying out the safety critical monitoring functions using the standard computer hardware available in a personal computer, it does so at a potential cost of processing speed.

SUMMARY OF THE INVENTION

The main object of the present invention is to provide a safety critical processor operating concurrently with the main processor of the personal computer which interacts with the intermediate shell to carry out the safety critical monitoring functions without compromising the speed of the personal computer.

The safety critical processor can be configured as a plug-in board which plugs into the available slots within a computer housing, or as a device which connects to one of the ports of the computer, such as the printer port or an equivalent port preferably having power available thereat.

These and other objects and advantages of the present invention are achieved in accordance with the present invention by a safety critical processor for a data processing system comprising means receptive of a series of timing signals from the intermediate shell for determining that a time interval between two of the series of timing signals is greater than a predetermined value thereby constituting a potential safety critical failure and means for indicating a potential safety critical failure to the intermediate shell.

In a preferred embodiment, a power supply provides a supply voltage and wherein the safety critical processor further comprises means for monitoring the supply voltage to determine that the voltage is outside predetermined limits for greater than a predetermined time and thereby constituting a potential safety critical failure. The system also comprises random access memory and the data processing means has means for accessing memory locations in the random access memory. The intermediate shell has means for determining defined locations for read-only portions of the random access memory and defined locations of random access memory for the application software and the safety critical processor has means for storing the defined locations of random access memory and means for comparing all memory accesses by the data processing means with the stored locations to determine if an improper access has occurred thereby constituting a potential safety critical failure.

Further in accordance with the invention, the data processing means includes means for producing control signals, the intermediate shell has means for indicating control signals to be produced by the data processing means and the safety critical processor has means receptive of indications of the control signals to be produced and means for comparing them to the control signals actually produced to indicate an unfavorable comparison, thereby constituting a potential safety critical failure.

Preferably, the intermediate shell has means for indicating a unique identification code and wherein the safety critical processor has means for storing a unique identification code and means receptive of the identification code indicated by the intermediate shell for comparing same to the stored identification code and for indicating a favorable or unfavorable comparison to the intermediate shell.

The safety critical processor preferably further comprises means receptive of data from the intermediate shell for encrypting same means for directing the encrypted data to the intermediate shell and means receptive of encrypted data from the intermediate shell for decrypting same.

The means for encrypting includes means for encrypting with a unique encryption key, the means for decrypting includes means for decrypting with said unique encryption key and the safety critical processor has means for indicating that the encrypted data was not encrypted with the unique encryption key, thereby constituting a potential safety critical failure.

Another object of the present invention is to provide a method of operating application software in a safety critical environment using the safety critical processor.

These and other features of the present invention are disclosed in the following detailed description of the invention taken with the attached drawings, wherein:

DETAILED DESCRIPTION OF THE INVENTION

Figure 1:
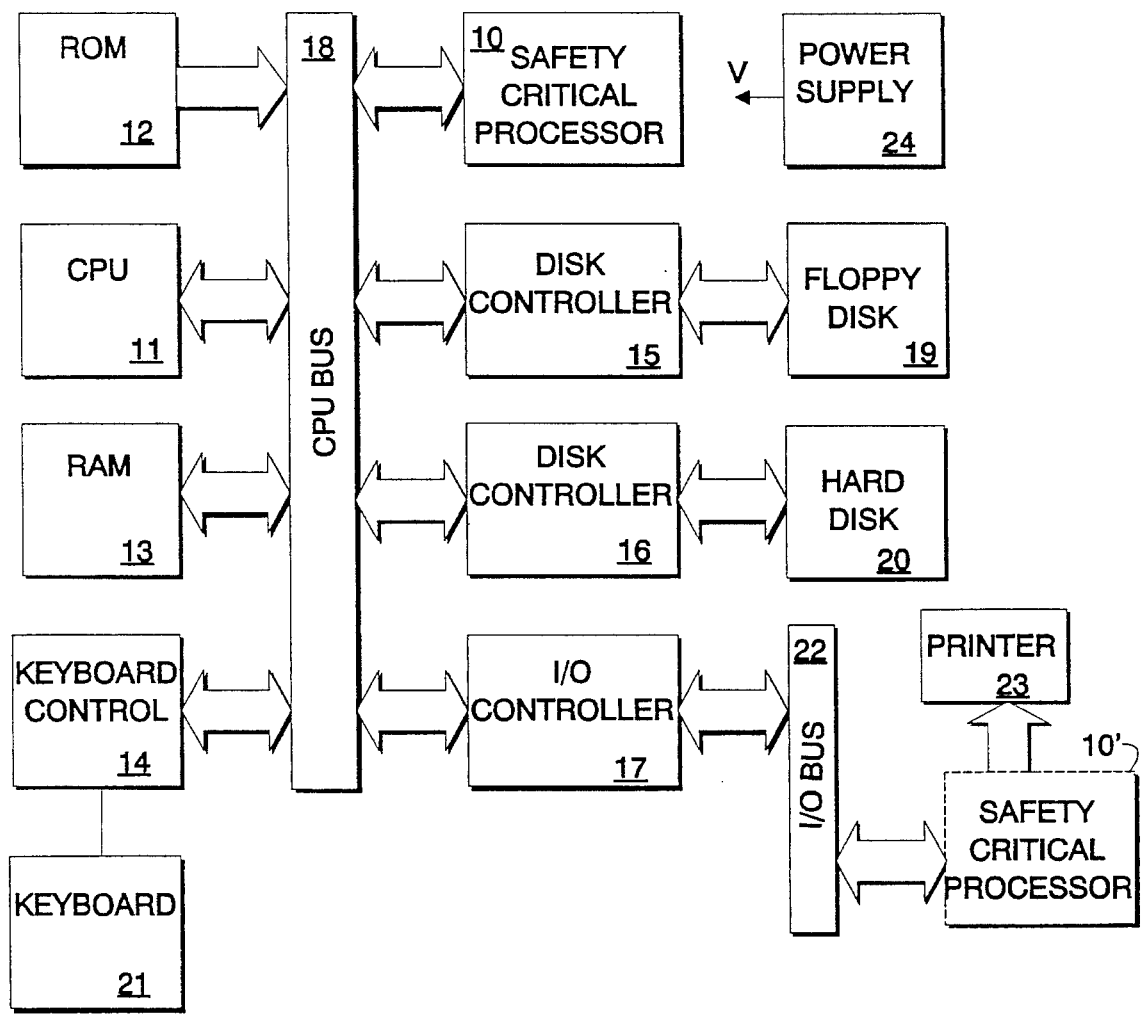
FIG. 1 is a block diagram of a data processing system including a safety critical processor according to the present invention.
Figure 3:
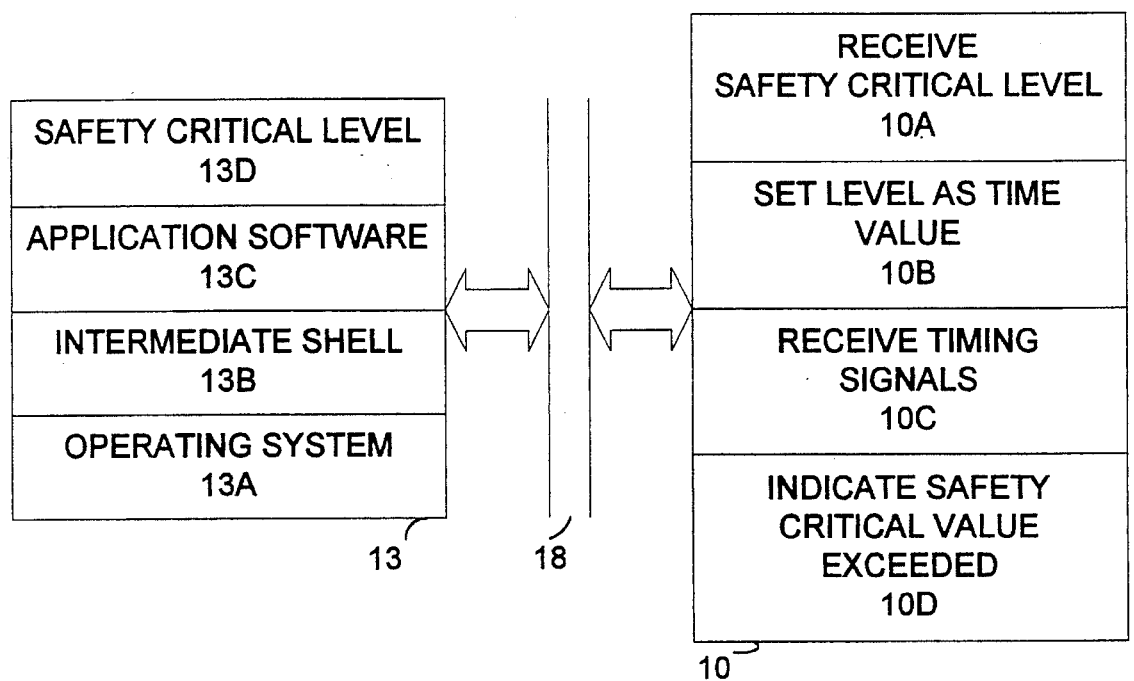
FIG. 3 is a functional block diagram of a portion of the system of FIG. 1

Present day microcomputer systems such as that shown in FIG. 1, with central processing units 11 based, for example, on either the Intel 80X86 or the Motorola 680XX microprocessors, are bus systems where the CPU 11 communicates on a CPU BUS 18 with other elements of the system including read only memory ROM 12, which includes two types of data, address lines which specify where the information is headed and data lines which carry the actual information. Current bus networks are 8, 12, 16, 32 and 64 bits. The ROM includes booting information which sends a simple program to the CPU, system information as to which elements are present in the system and a microprogram for carrying out the functions of the CPU. The CPU 11 also communicates via BUS 18 with random access memory (RAM) 13 which stores programs and data. As disclosed in U.S. Pat. No. 5,339,261, RAM 13 and/or ROM 12 will have the operating system 13A, intermediate shell 13B and application software—loaded therein during use in accordance with the present invention as shown in FIG 3.

The CPU also communicates over BUS 18 with a keyboard control or processor 14 which receives inputs from keyboard 21.

Data and software are also stored on floppy disk 19 and hard disk 20 which communicate through the BUS 18 via disk controllers 15 and 16.

The system also communicates with external devices, such as printer 23 and modems via an input/output controller 17 which in turn communicates with an I/O BUS 22 to which the external devices are connected via ports, such as serial ports and parallel ports.

The microcomputer also includes a power supply 24 which supplies a regulated voltage V to all of the elements.

The system according to the present invention also includes safety critical processor 10 which in one preferred embodiment of the present invention is connected to CPU bus 18 and acts in concert with and under the control of the intermediate shell stored in RAM 13 and/or ROM 12 to support safety critical functions.

In an alternative embodiment of the present invention, the safety critical processor 10' is connected to the I/O bus 22 and provides a parallel port at the output of thereof which allows a printer 23 to be connected thereto and receive printing information from I/O BUS 22 as a pass through.

Figure 2:
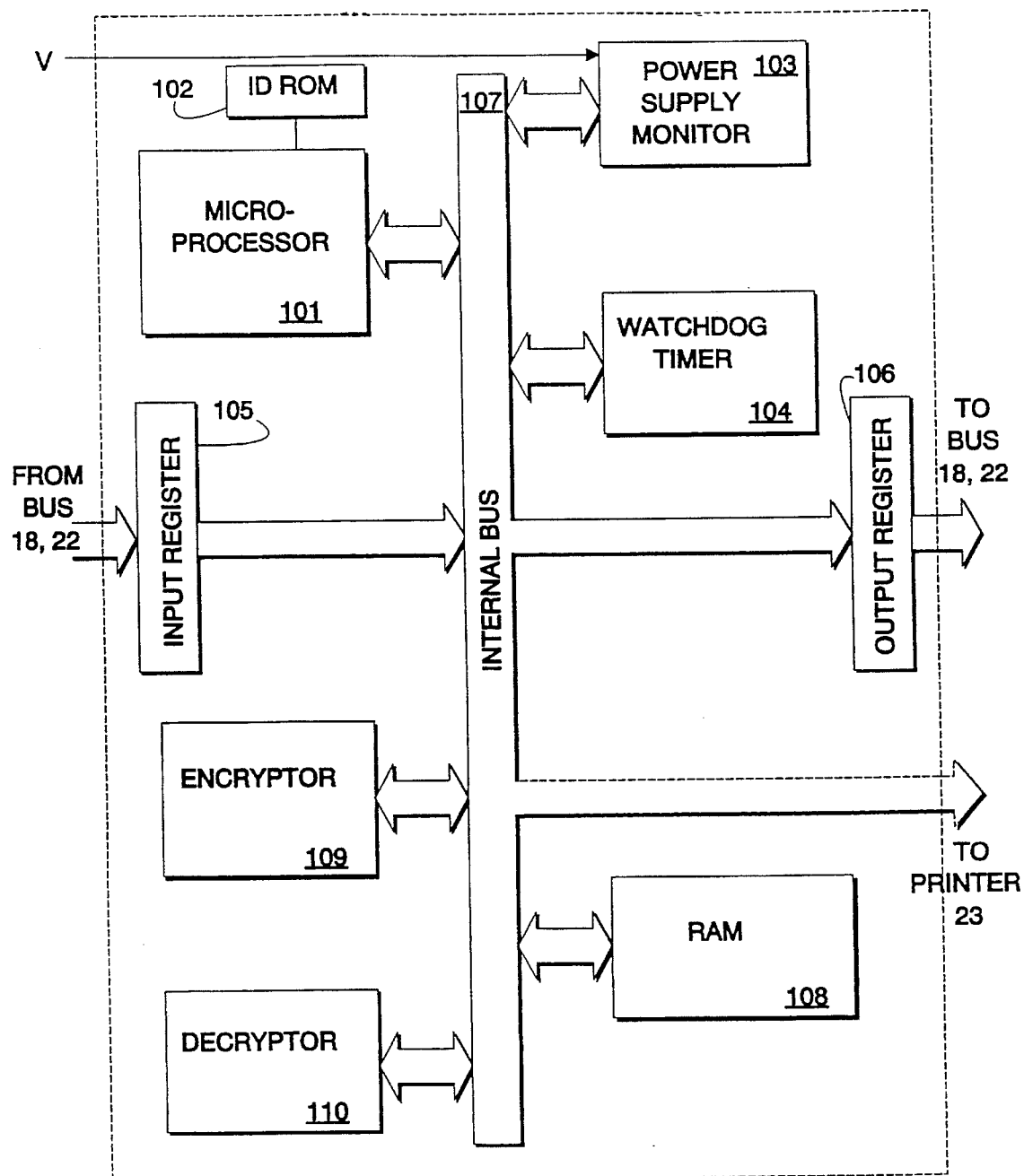
FIG. 2 is a block diagram of one embodiment of the safety critical processor according to the present invention.

FIG. 2 shows the key elements of method of implementing the safety critical processor 10, 10' shown in FIG. 1.

The safety critical processor includes an input register 105 which receives data from either the CPU BUS 18 when connected directly thereto or from the I/O BUS 22 when connected directly to an output port, such as a printer port or an equivalent port preferably having a power output available thereat. Information received at input register 105 is applied to an internal bus 107 of the safety critical processor and from there is communicated to the various elements of the system. The processor also includes an output register 106 which applies information to BUS 18 or 22.

The safety critical processor includes a separate microprocessor 101 which includes a microprogram to support all of the major functions of the safety critical processor as will be described.

Connected to BUS 107 is watchdog timer 104 which supports the verification that the intermediate shell is operating. The intermediate shell is required to notify the safety critical processor over BUS 18 or 22 that it is operating by applying a predefined series of signals onto the bus. The predefined series of signals signify that the intermediate shell is cycling. The predefined series of signals must occur within a defined period of time set by the microprocessor 101. The watchdog timer 104 monitors the time periods set by the microprocessor 101 and the series of signals received via BUS 107. If a new predefined series of signals is not received within the time period set by the microprocessor 101, the watchdog timer 104 will send an urgent high priority flag to the internal bus 107 which is applied to BUS 18 or 22 and immediately notifies the system to either terminate operation or inform the operator of a potential failure.

In use, the microprocessor 101 will normally disable the watchdog timer 104. The user first loads the intermediate shell into RAM 108 and thereafter an application program is run. The application program interacts with the intermediate shell to first set the level of safety criticality 13D in FIG. 3 in the system. This level of safety criticality is translated into a time value which is provided by the intermediate shell to microprocessor 101 and is received by means of function 10A and which then sets this value as the period of time by means of function 10B in which the predefined series of signals must occur for the watchdog timer. When the intermediate shell begins operation of the application program, it immediately informs microprocessor 101 of this fact, which causes the microprocessor 101 to enable the watchdog timer 104 to perform its function.

The watchdog timer then looks for the predefined series of signals by means of function 10C as well as the maximum period of time which may occur between receptions of those predefined series of signals before which a failure is defined by means of function 10C. The safety critical processor thereafter acts as an independent observer of the software activity until the intermediate shell informs the microprocessor 101 to terminate the monitoring, at which time the microprocessor 101 will disable the watchdog timer 104.

The safety critical processor also includes power supply monitor 103 which receives as a direct input the voltage V from power supply 24. The power supply monitor monitors the power levels in the system to verify that the computer power is within acceptable margins. The power supply monitor is able to determine the occurrence of an out of range reading for a defined period of time and notifies the microprocessor 101 via bus 107 of such an event.

As with the watchdog timer, the power supply monitor is disabled upon initial booting of the system. The monitoring and reporting function of the power supply monitor is initiated by the intermediate shell which indicates the start and stopping of the power supply monitoring function via a signal to the microprocessor 101 via BUS 18, 22. Microprocessor 101 then enables the power supply monitor 103 and disables it at the appropriate time. Any failure in the power supply is immediately communicated via BUS 107 to the microprocessor 101 which then is able to communicate this fact to the intermediate shell via BUS 18, 22.

The safety critical processor has RAM 108 connected to the internal bus 107 for the purpose of storing an address map of RAM 13, floppy disk 19 and hard disk 20. The purpose of the storage of a memory map in RAM 108 is to enable the safety critical processor to monitor all CPU and I/O BUS activity to determine if an address has been illegally accessed.

Microprocessor 101 monitors the address activity on the buses in order to determine whether an address designated as read only is being written to or if an address outside a defined area being used by the system is read from or written into. Upon the detection of such an occurrence, the microprocessor 101 will inform the intermediate shell so that an operator can be immediately notified.

The microprocessor 101 also monitors bus activity to determine whether the control signal activity from CPU 11 is correct. In this regard, the intermediate shell communicates with the safety critical processor to indicate the expected control signals. These signals are stored in RAM 108 and microprocessor 101 and receives the actual control signals via the BUS 18, 22 and compares them to the signals stored in RAM 108 to see if they are correct. The type of control signals that are monitored are system interrupts such as the clock interrupt, input/output device signals and check signals and direct memory access signals. The monitoring of signals to I/O devices permits verification that the system is not inputting from or outputting to improper devices. The interrupt monitoring verifies the clock cycle time as well as the activity of CPU 11.

Similar to the other monitoring functions, the address access and control signal monitoring is idle on the booting of the system. The monitoring is initiated via the intermediate shell after application software has been loaded and the level of safety criticality is indicated. Thereafter, the intermediate shell will supply the addresses of memory use designated as read only and the defined area for activity. The intermediate shell can change the monitored addresses as conditions dictate by communicating over the BUS with the microprocessor 101 which then causes the contents of RAM 108 to be changed. The level of criticality will dictate which activities are to be monitored and the action to be formed upon recognition of an improper activity.

Another element of the safety critical processor is the identification ROM 102 connected directly to microprocessor 101. The ID ROM 102 contains a unique identification code which is installed upon fabrication and is unique to the specific safety critical processor. This code is only accessible by the microprocessor 101 and is not available outside of the board via the internal bus 107 or the output register 106.

The purpose of the ID ROM 102 is to match the safety critical processor with a particular intermediate shell. The intermediate shell is made aware of the identification code in the ID ROM 102 upon the installation of both the intermediate shell and the safety critical processor. Thus any software used with the intermediate shell which is duplicated, will not be usable on another computer, since the shell will not operate unless it can first send the identification code to the safety critical processor and have the microprocessor 101 indicate that there is a match.

The identification code stored in the ID ROM 102 can also be used with application software to insure that copies of the application software are not being used illegally on machines other than a specific machine for which the software is to be installed.

The identification code and the ID ROM 102 is also usable with the encryption capability of the safety critical processor, as will be described hereinafter.

The safety critical processor also includes an encryptor 109 and a decryptor 110 connected to BUS 107. The encryptor 109 has an encryption key installed at fabrication and is not readable by either the intermediate shell or application software. The intermediate shell can request encryption of data by passing the data to the safety critical processor and receiving back the encrypted form of the data on BUS 18, 22. The use of the encryptor 109 will permit signatures to be placed on a data log to insure that the information in that log has not been falsified. This also acts as protection as well as validation of the performance of the application software and the intermediate shell.

The encrypted form of the data encrypted by encryptor 109 contains ancillary information which can be used to validate and authenticate it. Retrieval of the encrypted information will be permitted since the log can contain both encrypted and readable copies of the pertinent information. For actual validation of the encrypted data, the safety critical processor receives the encrypted data over BUS 18, 22 and applies it to the decryptor 110 which decrypts the information and verifies that it was actually encrypted by the same safety critical processor and supply the information for display to the system.

The data contained within the encrypted information contains not only the initially supplied information, but verification and signature information which can only be recognized by the specific safety critical processor which encrypted the data. Since this verification and signature information is not transmitted outside of the safety critical processor 10, it is virtually impossible to determine the encryption key or to falsify data.

The number and order of the encrypted data records in the log is controlled by the intermediate shell and the pertinent information within those records is defined by the intermediate shell based upon the level of safety criticality.

The intermediate shell also monitors the operation of the safety critical processor by communicating with it over BUS 18, 22 to insure that the safety critical processor is operating correctly. This communication is in the form of sanity checks and requests for performance of a known outcome operation. This permits the intermediate shell and the safety critical processor to mutually recognize a loss of the other and to take remedial actions if necessary.

The safety critical processor is also able to perform self tests in a background mode to be able to recognize internal problems. Any problems that are found will be indicated to the intermediate shell to initiate a failure mode operation. The self test includes sending known messages to the encryptor 109 from the microprocessor 101 and then sending them to decryptor 110 and verifying the results. Additionally, wrap around testing of the monitoring hardware can be performed by verifying that data at the output register 106 is the same as data in the input register 105.

The safety critical processor, when used in the configuration where it is connected directly to I/O BUS 22, also includes a connector which has direct access to the internal bus 107 as shown in FIG. 2. This connects to the printer 23 to act as a pass through of printer data from I/O BUS 22 to the printer 23. In this operation, the microprocessor 101 recognizes printer data and acts to directly transfer data from the input register directly to the printer 23 and vice versa.

It will be understood that the safety critical processor can be configured with a shared memory or a first in/first out memory used for communication between it and the intermediate shell. The safety critical processor can contain EEROM memory for storage of the general internal program and information used for identification and encryption. It is preferred that the actual system in identification and encryption keys be stored as part of a microcontroller type chip which will prevent access to that information and any control processing by external devices. A device failure will require the return of the safety critical processor to the factory for repair and/or replacement. It is also understood that the safety critical processor can include redundant components in cases where operation under failure is required until the operator can switch to a backup system.

It will be appreciated that the instant specification and claims as set forth by way of an illustration and not limitation and that various modifications and changes may be made without departing from the spirit and scope of the present invention.

What is claimed is:

1. A system for running application software in a safety critical environment, comprising:

a main processor;

a memory storing an operating system and application software for running under the operating system;

wherein the application software includes a first safety critical number stored in the memory and based upon a level of safety criticality set in the application software, the first safety critical number corresponding to a period of time in which software cycling must occur during the running of the application software;

a safety critical processor separate from the main processor;

a shell stored in the memory and providing an interface between the application software and the safety critical processor for applying the stored first safety critical number to the safety critical processor and for producing a series of timing signals signifying the actual software cycling period of the application software; and wherein the safety critical processor is receptive of the timing signals for continually comparing the timing signals to the stored first safety critical number applied by the shell to monitor the software cycling and for indicating a safety critical failure when the period between timing signals exceeds the first safety critical number, whereby a safety critical environment is created for the application software.

2. The system according to claim 1, further comprising:

a power supply for providing a supply voltage for the system; and wherein the application software includes second safety critical numbers stored in the memory and based upon the level of safety set in the application software, the second safety critical numbers corresponding to limits for the supply voltage and a time period for which the limits can be exceeded; and wherein the safety critical processor includes a power supply monitor for monitoring the supply voltage and for indicating a safety critical failure when the supply voltage exceeds said limits for greater than said time period.

3. The system according to claim 1, wherein the application software includes third safety critical numbers stored in the memory and based upon the level of safety set in the application software, the third safety critical numbers corresponding to a first set of addresses in the memory for storing the application software and a second set of addresses in the memory which are to be read-only; and wherein the safety critical processor receives the third safety critical numbers from the shell for indicating a safety critical failure when the main processor accesses the memory to write data in the first and second sets of addresses.

4. The system according to claim 1, wherein the main processor produces control signals during the running of the application software and wherein the safety critical processor monitors a number of the control signals during the running of the application software based upon the level of safety criticality set by the application software.

5. The system according to claim 1, wherein the safety critical processor and the shell have unique identification codes associated therewith and wherein the safety critical processor compares the two codes before processing.

6. The system according to claim 1, wherein the shell applies data to the safety critical processor; and wherein the safety critical processor comprises an encryptor receptive of the data applied by the shell for encrypting the data and returning the encrypted data to the shell.

7. The system according to claim 6, wherein the shell applies encrypted data to the safety critical processor; and wherein the safety critical processor comprises a decryptor receptive of the encrypted data applied by the shell for decrypting the data and returning the decrypted data to the shell.

8. The system according to claim 7, wherein the encryptor encrypts with a unique encryption key and the decryptor decrypts with the unique encryption key and wherein the safety critical processor indicates a safety critical failure when the encrypted data is not encrypted with the unique encryption key.

9. The system according to claim 1, further comprising a main bus to which the main processor, memory and safety critical processor are connected.

10. The system according to claim 1, further comprising:

an input/output bus, a main bus to which the main processor and memory are connected, an input/output controller connecting the main bus to the input/output bus; and wherein the safety critical processor is connected to the input/output bus.

11. A method for running application software in a safety critical environment, comprising the steps of:

storing application software in a memory for running the application software under an operating system and a main processor;

storing a first safety critical number in the memory and based upon a level of safety criticality set in the application software, the first safety critical number corresponding to a period of time in which software cycling must occur during the running of the application software;

producing a series of timing signals signifying the actual software cycling period of the application software; and continually comparing the timing signals to the stored first safety critical number in a separate safety critical processor to monitor the software cycling and for indicating a safety critical failure when the period between timing signals exceeds the first safety critical number, whereby a safety critical environment is created for the application software.

12. The method according to claim 11, further comprising:

providing a supply voltage for the system; and storing second safety critical numbers in the memory and based upon the level of safety set in the application software, the second safety critical numbers corresponding to limits for the supply voltage and a time period for which the limits can be exceeded; and monitoring the supply voltage and for indicating a safety critical failure when the supply voltage exceeds said limits for greater than said time period.

13. The method according to claim 11, further comprising the steps of:

storing third safety critical numbers in the memory and based upon the level of safety set in the application software, the third safety critical numbers corresponding to a first set of addresses in the memory for storing the application software and a second set of addresses in the memory which are to be read-only; and indicating a safety critical failure when the memory is accessed to write data in the first and second sets of addresses.

14. The method according to claim 11, further comprising the steps of:

producing control signals during the running of the application software; and monitoring a number of the control signals during the running of the application software based upon the level of safety criticality set by the application software.

15. A safety critical processor comprising:

an input register receptive of a first safety critical number stored in a memory and based upon a level of safety criticality set in application software, the first safety critical number corresponding to a period of time in which software cycling must occur during running of the application software;

wherein the input register is receptive of a series of timing signals signifying the actual software cycling period of the application software; and a timer for continually comparing the timing signals to the first safety critical number applied to monitor the software cycling and for indicating a safety critical failure when the period between timing signals exceeds the first safety critical number, whereby a safety critical environment is created for the application software.

16. The safety critical according to claim 15, wherein the input register is receptive of second safety critical numbers based upon the level of safety set in the application software, the second safety critical numbers corresponding to limits for a supply voltage and a time period for which the limits can be exceeded; and further comprising a power supply monitor for monitoring the supply voltage and for indicating a safety critical failure when the supply voltage exceeds said limits for greater than said time period.

17. The safety critical processor according to claim 15, wherein the input register is receptive of third safety critical numbers and based upon the level of safety set in the application software, the third safety critical numbers corresponding to a first set of addresses in a memory for storing the application software and a second set of addresses in the memory which are to be read-only; and further comprising a microprocessor for indicating a safety critical failure when the memory is accessed to write data in the first and second sets of addresses.

18. The safety critical processor according to claim 15, wherein the input register is receptive of control signals during the running of the application software; and further comprising a microprocessor for monitoring a number of the control signals based upon the level of safety criticality set by the application software.

19. The safety critical processor according to claim 15, wherein the input register is receptive of data; and further comprising an output register and an encryptor receptive of the data from the input register for encrypting the data and applying the encrypted data to the output register.

20. The safety critical processor according to claim 19, wherein the input register is receptive of encrypted data; and further comprising a decryptor receptive of the encrypted data from the input register for decrypting the encrypted data and applying the decrypted data to the output register.

21. The safety critical processor according to claim 20, wherein the encryptor encrypts with a unique encryption key and the decryptor decrypts with the unique encryption key and further comprising a microprocessor for indicating a safety critical failure when the encrypted data is not encrypted with the unique encryption key.

* * * * *